(12) United States Patent
Tucker et al.

(10) Patent No.: US 8,445,159 B2
(45) Date of Patent: May 21, 2013

(54) SEALED JOINT STRUCTURE FOR ELECTROCHEMICAL DEVICE

(75) Inventors: Michael C. Tucker, Oakland, CA (US); Craig P. Jacobson, Moraga, CA (US); Lutgard C. De Jonghe, Lafayette, CA (US); Steven J. Visco, Berkeley, CA (US)

(73) Assignee: The Regents of The University of California, Oakland, CA (US)

( * ) Notice: Subject to any disclaimer, the term of this patent is extended or adjusted under 35 U.S.C. 154(b) by 1397 days.

(21) Appl. No.: 11/791,270

(22) PCT Filed: Nov. 28, 2005

(86) PCT No.: PCT/US2005/042995
§ 371 (c)(1),
(2), (4) Date: Feb. 12, 2008

(87) PCT Pub. No.: WO2006/127045
PCT Pub. Date: Nov. 30, 2006

(65) Prior Publication Data
US 2008/0268323 A1    Oct. 30, 2008

Related U.S. Application Data

(60) Provisional application No. 60/632,015, filed on Nov. 30, 2004.

(51) Int. Cl.
| H01M 8/24 | (2006.01) |
| H01M 8/10 | (2006.01) |
| H01M 2/20 | (2006.01) |
| H01M 2/08 | (2006.01) |
| H01M 2/14 | (2006.01) |

(52) U.S. Cl.
USPC ........... 429/452; 429/465; 429/467; 429/468; 429/469; 429/470; 429/507; 429/508

(58) Field of Classification Search
USPC .............. 429/452, 460, 479, 482, 507–510
See application file for complete search history.

(56) References Cited

U.S. PATENT DOCUMENTS

| 3,126,311 A | 3/1964 | Harris |
| 3,324,543 A | 6/1967 | McVey et al. |

(Continued)

FOREIGN PATENT DOCUMENTS

| CN | 1471714 | 1/2004 |
| CN | 1498877 | 5/2004 |

(Continued)

OTHER PUBLICATIONS

CN200580040834.4, Notification to grant patent right for invention, mailed Apr. 17, 2009.

(Continued)

*Primary Examiner* — Barbara Gilliam
*Assistant Examiner* — Adam A Arciero
(74) *Attorney, Agent, or Firm* — Weaver Austin Villeneuve & Sampson LLP (57) ABSTRACT

Several members make up a joint in a high-temperature electrochemical device, wherein the various members perform different functions. The joint is useful for joining multiple cells (generally tubular modules) of an electrochemical device to produce a multi-cell segment-in-series stack for a solid oxide fuel cell, for instance. The joint includes sections that bond the joining members to each other; one or more seal sections that provide gas-tightness, and sections providing electrical connection and/or electrical insulation between the various joining members. A suitable joint configuration for an electrochemical device has a metal joint housing, a first porous electrode, a second porous electrode, separated from the first porous electrode by a solid electrolyte, and an insulating member disposed between the metal joint housing and the electrolyte and second electrode. One or more brazes structurally and electrically connects the first electrode to the metal joint housing and forms a gas tight seal between the first electrode and the second electrode.

21 Claims, 4 Drawing Sheets

U.S. PATENT DOCUMENTS

| | | | |
|---|---|---|---|
| 3,402,230 | A | 9/1968 | White |
| 3,526,646 | A | 9/1970 | Tannenberger et al. |
| 3,668,010 | A | 6/1972 | Fally et al. |
| 3,773,549 | A | 11/1973 | Elbert |
| 4,035,547 | A | 7/1977 | Heller et al. |
| 4,560,607 | A | 12/1985 | Sumner |
| 4,562,124 | A | 12/1985 | Ruka |
| 4,578,214 | A | 3/1986 | Jungerhans |
| 4,624,897 | A | 11/1986 | Ito |
| 4,687,717 | A | 8/1987 | Kaun et al. |
| 4,720,335 | A | 1/1988 | Fukushima et al. |
| 4,763,828 | A | 8/1988 | Fukaya et al. |
| 4,847,172 | A | 7/1989 | Maskalick et al. |
| 4,917,958 | A | 4/1990 | Akai et al. |
| 4,929,294 | A | 5/1990 | Blome |
| 4,942,999 | A * | 7/1990 | Oda et al. .................. 228/124.7 |
| 5,013,612 | A | 5/1991 | Hunt et al. |
| 5,043,229 | A | 8/1991 | Mizuhara |
| 5,085,720 | A | 2/1992 | Mikeska et al. |
| 5,127,969 | A | 7/1992 | Sekhar |
| 5,173,372 | A | 12/1992 | Matsuo et al. |
| 5,236,787 | A | 8/1993 | Grassi |
| 5,240,480 | A | 8/1993 | Thorogood et al. |
| 5,279,909 | A | 1/1994 | Horner et al. |
| 5,306,411 | A | 4/1994 | Mazanec et al. |
| 5,318,951 | A | 6/1994 | Shintaku et al. |
| 5,328,779 | A | 7/1994 | Tannenberger et al. |
| 5,366,770 | A | 11/1994 | Wang |
| 5,409,784 | A | 4/1995 | Bromberg et al. |
| 5,441,825 | A | 8/1995 | Barlow |
| 5,480,739 | A | 1/1996 | Kawasaki et al. |
| 5,487,803 | A | 1/1996 | Sweeney et al. |
| 5,589,285 | A | 12/1996 | Cable et al. |
| 5,599,383 | A | 2/1997 | Dyer et al. |
| 5,616,223 | A | 4/1997 | Shen et al. |
| 5,626,914 | A * | 5/1997 | Ritland et al. ................ 427/377 |
| 5,629,103 | A | 5/1997 | Wersing et al. |
| 5,633,081 | A | 5/1997 | Clough et al. |
| 5,670,270 | A | 9/1997 | Wallin |
| 5,672,848 | A | 9/1997 | Komorita et al. |
| 5,686,198 | A | 11/1997 | Kuo et al. |
| 5,735,332 | A | 4/1998 | Ritland et al. |
| 5,741,605 | A * | 4/1998 | Gillett et al. ................. 429/415 |
| 5,750,279 | A | 5/1998 | Carolan et al. |
| 5,787,578 | A | 8/1998 | Farooq et al. |
| 5,827,620 | A | 10/1998 | Kendall |
| 5,908,713 | A | 6/1999 | Ruka et al. |
| 5,932,368 | A | 8/1999 | Batawi et al. |
| 5,938,822 | A | 8/1999 | Chen et al. |
| 5,976,216 | A | 11/1999 | Samal et al. |
| 5,993,986 | A | 11/1999 | Wallin et al. |
| 6,007,683 | A | 12/1999 | Jankowski et al. |
| 6,017,647 | A | 1/2000 | Wallin |
| 6,188,582 | B1 | 2/2001 | Peter |
| 6,217,732 | B1 | 4/2001 | Schuh et al. |
| 6,270,642 | B1 | 8/2001 | Basu et al. |
| 6,293,978 | B2 | 9/2001 | Kleefisch et al. |
| 6,296,910 | B1 * | 10/2001 | Choy et al. .................... 427/475 |
| 6,344,291 | B1 | 2/2002 | Hitomi |
| 6,348,273 | B1 | 2/2002 | Ishikawa et al. |
| 6,358,567 | B2 | 3/2002 | Pham et al. |
| 6,368,383 | B1 | 4/2002 | Virkar et al. |
| 6,372,078 | B1 | 4/2002 | Melchert et al. |
| 6,390,354 | B1 | 5/2002 | Makino et al. |
| 6,420,064 | B1 | 7/2002 | Ghosh et al. |
| 6,428,920 | B1 | 8/2002 | Badding et al. |
| 6,436,565 | B1 | 8/2002 | Song et al. |
| 6,440,578 | B1 | 8/2002 | Shinkai et al. |
| 6,492,050 | B1 | 12/2002 | Sammes |
| 6,541,146 | B1 | 4/2003 | Xue et al. |
| 6,565,621 | B2 | 5/2003 | Shinkai et al. |
| 6,576,363 | B1 | 6/2003 | Hitomi |
| 6,589,680 | B1 | 7/2003 | Gorte et al. |
| 6,605,316 | B1 | 8/2003 | Visco et al. |
| 6,653,009 | B2 * | 11/2003 | Wang et al. ................... 429/469 |
| 6,656,625 | B1 | 12/2003 | Thompson et al. |
| 6,682,842 | B1 | 1/2004 | Visco et al. |
| 6,742,700 | B2 | 6/2004 | Makino et al. |
| 6,767,622 | B2 | 7/2004 | Hada et al. |
| 6,767,662 | B2 | 7/2004 | Jacobson et al. |
| 6,783,880 | B2 | 8/2004 | Christiansen |
| 6,800,323 | B2 | 10/2004 | Pan |
| 6,846,511 | B2 | 1/2005 | Visco et al. |
| 6,887,361 | B1 | 5/2005 | Visco et al. |
| 6,896,992 | B2 | 5/2005 | Kearl |
| 6,974,516 | B2 | 12/2005 | Devoe et al. |
| 6,979,511 | B2 | 12/2005 | Visco et al. |
| 6,994,884 | B1 | 2/2006 | Guan et al. |
| 7,055,733 | B2 | 6/2006 | Weil et al. |
| 7,118,777 | B2 | 10/2006 | Visco et al. |
| 7,153,559 | B2 | 12/2006 | Ito et al. |
| 7,163,713 | B2 | 1/2007 | Jacobson et al. |
| 7,208,246 | B2 | 4/2007 | Herman et al. |
| 7,218,502 | B2 | 5/2007 | Fujii et al. |
| 7,232,626 | B2 | 6/2007 | Jacobson et al. |
| 7,273,673 | B2 | 9/2007 | Akikusa et al. |
| 7,351,488 | B2 | 4/2008 | Visco et al. |
| 7,553,573 | B2 | 6/2009 | Visco et al. |
| 2001/0012576 | A1 | 8/2001 | Christiansen et al. |
| 2002/0028367 | A1 | 3/2002 | Sammes et al. |
| 2002/0048699 | A1 | 4/2002 | Steele et al. |
| 2002/0081762 | A1 | 6/2002 | Jacobson et al. |
| 2002/0177031 | A1 | 11/2002 | Doshi et al. |
| 2003/0021900 | A1 | 1/2003 | Jacobson et al. |
| 2003/0024611 | A1 | 2/2003 | Cornie et al. |
| 2003/0059668 | A1 * | 3/2003 | Visco et al. ..................... 429/44 |
| 2003/0132270 | A1 | 7/2003 | Weil et al. |
| 2003/0188637 | A1 | 10/2003 | Ito et al. |
| 2003/0224234 | A1 | 12/2003 | Steele et al. |
| 2004/0023101 | A1 | 2/2004 | Jacobson et al. |
| 2004/0028994 | A1 | 2/2004 | Akikusa et al. |
| 2004/0112478 | A1 | 6/2004 | Bieler et al. |
| 2004/0115416 | A1 | 6/2004 | Nonninger et al. |
| 2004/0135324 | A1 | 7/2004 | Brule et al. |
| 2004/0219423 | A1 | 11/2004 | Tunney et al. |
| 2004/0231143 | A1 | 11/2004 | Visco et al. |
| 2004/0240142 | A1 | 12/2004 | Fujii et al. |
| 2005/0000621 | A1 | 1/2005 | Devoe et al. |
| 2005/0022921 | A1 | 2/2005 | Morrison et al. |
| 2005/0037252 | A1 | 2/2005 | Pham |
| 2005/0048343 | A1 * | 3/2005 | Thirukkvalur .................. 429/32 |
| 2005/0095479 | A1 * | 5/2005 | Mardilovich et al. ........... 429/30 |
| 2005/0147857 | A1 | 7/2005 | Crumm et al. |
| 2005/0170234 | A1 | 8/2005 | Liu et al. |
| 2005/0214612 | A1 | 9/2005 | Visco et al. |
| 2005/0214616 | A1 * | 9/2005 | Kumar et al. ..................... 429/33 |
| 2005/0221153 | A1 | 10/2005 | Sugimoto et al. |
| 2005/0271931 | A1 | 12/2005 | Finnerty |
| 2006/0029860 | A1 | 2/2006 | Ketcham et al. |
| 2006/0051643 | A1 | 3/2006 | Sarkar et al. |
| 2006/0057295 | A1 | 3/2006 | Visco et al. |
| 2006/0119669 | A1 | 6/2006 | Sharma et al. |
| 2006/0153974 | A1 | 7/2006 | Matsuzaki et al. |
| 2006/0228615 | A1 | 10/2006 | Armstrong et al. |
| 2006/0234112 | A1 | 10/2006 | Visco et al. |
| 2007/0059576 | A1 | 3/2007 | Jacobson et al. |
| 2007/0117006 | A1 | 5/2007 | Zhan et al. |
| 2007/0148503 | A1 | 6/2007 | Okazaki |
| 2007/0166603 | A1 | 7/2007 | Nakanishi et al. |
| 2008/0118804 | A1 | 5/2008 | Tucker et al. |
| 2008/0131723 | A1 | 6/2008 | Tucker et al. |
| 2008/0254335 | A1 | 10/2008 | Torgerson et al. |
| 2008/0268323 | A1 | 10/2008 | Tucker et al. |
| 2009/0148743 | A1 | 6/2009 | Day |
| 2009/0220765 | A1 | 9/2009 | Okumura et al. |
| 2010/0038012 | A1 | 2/2010 | Tucker et al. |
| 2010/0143824 | A1 | 6/2010 | Tucker et al. |
| 2011/0053041 | A1 | 3/2011 | Tucker et al. |
| 2011/0104586 | A1 | 5/2011 | Tucker et al. |
| 2011/0269047 | A1 | 11/2011 | Tucker et al. |
| 2012/0325678 | A1 | 12/2012 | Visco et al. |

FOREIGN PATENT DOCUMENTS

| | | |
|---|---|---|
| CN | 101065860 | 10/2007 |
| CN | 200580040834 | 10/2007 |
| CN | 200580041105 | 11/2007 |
| CN | ZL200580040834.4 | 8/2009 |

| | | |
|---|---|---|
| CN | ZL200580041105.0 | 12/2009 |
| EP | 0428275 | 5/1991 |
| EP | 0562724 | 9/1993 |
| EP | 1122806 | 8/2001 |
| EP | 1699104 | 9/2006 |
| EP | 2250295 | 1/2012 |
| FR | 1585403 | 1/1970 |
| GB | 1276615 | 6/1972 |
| GB | 1383343 | 12/1974 |
| GB | 2156257 | 10/1985 |
| JP | 59-046695 | 9/1980 |
| JP | 56-002549 | 1/1981 |
| JP | 59-015960 | 1/1984 |
| JP | 59-016695 | 1/1984 |
| JP | 60-090875 | 5/1985 |
| JP | 05-089883 | 4/1993 |
| JP | 05-163078 | 6/1993 |
| JP | 06-042990 | 2/1994 |
| JP | 40-700676801 | 1/1995 |
| JP | 07-069749 | 3/1995 |
| JP | 07-126079 | 5/1995 |
| JP | 07237980 | 9/1995 |
| JP | 07-067747 | 10/1995 |
| JP | 09-092301 | 4/1997 |
| JP | 09-188582 | 7/1997 |
| JP | 09-296203 | 11/1997 |
| JP | 10-021931 | 1/1998 |
| JP | 11-292618 | 10/1999 |
| JP | 11-297333 | 10/1999 |
| JP | 2001-126745 | 5/2001 |
| JP | 2002-301588 | 10/2002 |
| JP | 2002289249 | 10/2002 |
| JP | 2003-288913 | 10/2003 |
| JP | 2004-039574 | 2/2004 |
| JP | 2004-047598 | 2/2004 |
| JP | 2004-127761 | 4/2004 |
| JP | 2004-142971 | 5/2004 |
| JP | 2004-164864 | 6/2004 |
| JP | 2004-207088 | 7/2004 |
| JP | 2004-273736 | 9/2004 |
| JP | 2005-288526 | 10/2005 |
| JP | 2005-353493 | 12/2005 |
| RU | 1822388 | 6/1993 |
| RU | 2236331 | 1/2003 |
| RU | 2197441 | 9/2004 |
| SU | 1407675 | 7/1988 |
| WO | WO9965642 | 12/1990 |
| WO | 97/00734 | 9/1997 |
| WO | 99/52165 | 10/1999 |
| WO | 9952165 | 10/1999 |
| WO | WO99/66570 | * 12/1999 |
| WO | WO9966570 | 12/1999 |
| WO | 00-34539 | 6/2000 |
| WO | 00/52780 | 9/2000 |
| WO | 02/35634 | 5/2002 |
| WO | 03/007312 | 1/2003 |
| WO | 2004008556 | 1/2004 |
| WO | WO2004070858 | 8/2004 |
| WO | 2006/044313 | 4/2006 |
| WO | 2006/082057 | 8/2006 |
| WO | 2006/086037 | 8/2006 |
| WO | 2006/091250 | 8/2006 |
| WO | 2006086037 | 8/2006 |
| WO | 2006/116153 | 11/2006 |
| WO | 2006-127045 | 11/2006 |
| WO | 2008/016345 | 2/2008 |
| WO | 2009/014775 | 1/2009 |
| WO | 2009/099447 | 8/2009 |
| WO | 2009/128849 | 10/2009 |
| WO | 2010/030300 | 3/2010 |
| WO | 2011/127283 | 10/2011 |

OTHER PUBLICATIONS

CN200580041105.0, Notification to grant patent right for invention, mailed Aug. 28, 2009.
EP patent application No. 05857595.2, Search Report mailed Oct. 15, 2009.
EP patent application No. 05857980.6, Supplemental Search Report mailed Dec. 15, 2009.
EP patent application No. 05857587.9, Supplemental Search Report mailed Oct. 26, 2009.
MY patent application No. PI20055578, Examination Report mailed Aug. 14, 2009.
RU patent application No. 2007124484-02, Office Action mailed Nov. 16, 2009.
TW patent application No. 094141561, Examination Report mailed Mar. 8, 2010.
VN patent application No. 1-2007-01278, Exam Report mailed Jul. 7, 2007.
VN patent application No. 1-2007-01267, Exam Report mailed Jul. 29, 2009.
Naka, Masaaki et al., "Joining of plain carbon steel to alumina with copper filler metal", Yosetsu Gakkai Ronbunshu—Quarterly Journal of the Japan Welding Society, Yosetsu Gakkai, Tokyo, Japan, vol. 3, No. 4, Nov. 1, 1985, pp. 702-707, XP009010006, ISSN: 0288-4771.
AU patent application No. 2005332026, Exam Report mailed Sep. 29, 2010.
AU patent application No. 2005327925, Office Action mailed Jul. 5, 2010.
AU patent application No. 2005327164, Office Action mailed Aug. 6, 2010.
JP patent application No. 2007-543481, Exam Report mailed Oct. 5, 2010.
JP patent application No. 2007-543481, Notification of reasons for rejection mailed Oct. 5, 2010 (English translation).
Translated excerpt from JP2005-288526.
Translated excerpt from JP2004-047598.
CN patent application No. 200680055443.4, Office Action mailed Dec. 21, 2010.
RU patent application No. 200910693002, Office Action mailed Sep. 21, 2010.
WO patent application No. PCT/US05/042572, International Preliminary Report on Patentability mailed Jun. 14, 2006.
Naka, Masaaki et al., "Joining of plain carbon steel to alumina with copper filler metal", XP009010006, Nov. 1985.
U.S. Appl. No. 11/791,269, Office Action mailed Dec. 27, 2010.
U.S. Appl. No. 11/791,258, Office Action mailed Feb. 16, 2011.
CN patent application No. 200580041105.0, Office Action mailed Oct. 24, 2008.
RU patent application No. 200712448309, Office Action mailed Jan. 26, 2009.
WO patent application No. PCT/US05/43109, International Search Report and Written Opinion mailed Oct. 12, 2006.
WO patent application No. PCT/US05/42572, International Search Report and Written Opinion mailed Jun. 29, 2006.
Li, J.Q. et al., "Fabrication and thermal properties of a YSZ-NiCr joint with an interlayer of YSZ-NiCr functionally graded material", Journal of the European Ceramic Society 23 (2003) 1847-1853.
Zhou, Xia et al., "Fabrication of composite alloy cladding material by brazing process", Journal of Materials Processing Technology 168 (2005) 280-285.
Zhu, Minguang et al., "Improving the strength of brazed joints to alumina by adding carbon fibres", 0022-2461, Apr. 17, 1997, Chapman & Hall.
Blugan, Gurdial et al., "Brazing of silicon nitride ceramic composite to steel using SiC-particle-reinforced active brazing alloy", 0272-8842, Mar. 10, 2006, Elsevier Ltd. and Techna Group.
CN patent application No. 200580040834.4, Office Action mailed Aug. 1, 2008.
WO patent application No. PCT/US2008/060362, International Search Report and Written Opinion mailed Jan. 12, 2009.
WO patent application No. PCT/US2008/066737, International Search Report and Written Opinion mailed Jan. 29, 2009.
WO patent application No. PCT/US2008/053869, International Search Report and Written Opinion mailed Oct. 29, 2008.
WO patent application No. PCT/US2008/081531, International Search Report and Written Opinion mailed Mar. 31, 2009.
Lee, Sungkyu et al., "Fabrication and characterization of Cu/YSZ cermet high-temperature electrolysis cathode material prepared by high-entergy ball-milling method I. 900° C-sintered", Journal of Alloys and Compounds 448 (2008) 363-367, Aug. 17, 2007.

Gorte, Raymond J. et al., "Anodes for direct oxidation of dry hydrocarbons in a solid-oxide fuel cell", Advanced Materials, 2000, 12, No. 19, pp. 1465-1469, Oct. 2, 2000.

Park, Seungdoo et al., "Direct oxidation of Hydrocarbons in a solid Oxide Fuel Cell I. Methane Oxidation" Journal of the Electrochemical Society, 146 (10) 3603-3605 (1999), Mar. 8, 1999.

U.S. Appl. No. 12/304,191, "Joined Concentric Tubes", Tucker et al., filed May 21, 2009.

U.S. Appl. No. 12/664,646, "Interlocking structure for high temperature electrochemical device and method for making the same", Tucker et al., filed Dec. 14, 2009.

U.S. Appl. No. 61/046,313, "Integrated seal for high-temperature electrochemical device", Tucker et al., filed Apr. 18, 2008.

U.S. Appl. No. 61/025,987, "CU-based cermet for high-temperature electrochemical device", Tucker et al., filed Feb. 4, 2008.

U.S. Appl. No. 61/026,079, "CU-based cermet for high-temperature electrochemical device", Tucker et al., filed Feb. 4, 2008.

U.S. Appl. No. 61/096,177, "Metal-supported, segmented-in-series high temperature electrochemical device", Tucker et al., filed Sep. 11, 2008.

WO patent application No. PCT/US2006/029580, International Search Report and Written Opinion mailed Jul. 3, 2008.

Stevenson, Jeff, "SOFC Seals: Material status", SECA Core Technology Program—SOFC Meeting, Jul. 8, 2003, 28 pages.

PCT patent application No. PCT/US05/42995, International Search Report dated Dec. 26, 2006.

PCT patent application No. PCT/US05/42995, Written Opinion.

CA patent application No. 2,627,786, Office Action mailed Dec. 21, 2010.

European Examination Report mailed Feb. 14, 2011, for Application No. 08 768 912.1-3122.

JP patent application No. 2007-543579, Office Action mailed Jan. 25, 2011.

European Examination Report mailed Jun. 17, 2011 for Application No. 08770865.7.

U.S. Appl. No. 11/791,258, Office Action mailed Aug. 18, 2011.

U.S. Appl. No. 11/791,269, Office Action mailed Sep. 30, 2011.

U.S. Appl. No. 12/304,191, Office Action mailed Sep. 30, 2011.

EP patent application No. 05857587.9, Examination Report mailed Aug. 15, 2011.

MY patent application No. PI 20055579, Substantive Examination Adverse Report mailed Aug. 15, 2011.

CN patent application No. 200680055443.4, Second Office Action mailed Jul. 12, 2011.

EP patent application No. 08826523.6, Supplemental European Search Report mailed Aug. 30, 2011.

PH patent application No. 12008502790, Office Action mailed Sep. 12, 2011.

EP patent application No. 08826523.6, Extended Search Report mailed Aug. 30, 2011.

U.S. Appl. No. 11/791,258, Office Action mailed Dec. 6, 2011.

JP patent application No. 2007-543579, Final Decision of Rejection mailed Oct. 4, 2011.

CA patent application No. 2,627,863, Office Action mailed Nov. 17, 2011.

JP patent application No. 2007-543481, Office Action mailed Nov. 29, 2011.

JP patent application No. 2009-521730, Office Action mailed Oct. 25, 2011.

RU patent application No. 2010147046/20(067957), Office Action of the Formal Examination mailed May 4, 2011.

MY patent application No. PI20055578, substantive examination mailed Dec. 30, 2011.

KR patent application No. 10-2007-7009946, Notification of Provisional Rejection mailed Jan. 20, 2012.

IN patent application No. 2386/KOLN/2007, First Examination Report mailed Jan. 31, 2012.

EP patent application No. 06836096.5, Supplementary European Search Report mailed Feb. 3, 2012.

Ishida et al., NGK Spark Plug Co. Ltd., abstract of JP 19830079832, Thomson Scientific, XP-002667365, Nov. 21, 1984.

Fujiki et al., Kobe Steel Ltd., abstract of JP 19960109959, Thomson Scientific, XP-002667366, Nov. 18, 1997.

AU patent application No. 2008279577, Examiner's first report mailed Jan. 27, 2012.

PH patent application No. 12010500175, Office Action mailed Feb. 2, 2012.

RU patent application No. 2010136676/20, Office Action of the Formal Examination mailed Jan. 17, 2011.

TW patent application No. 094141908, Search Report mailed Mar. 19, 2012.

U.S. Appl. No. 12/304,191, Notice of Allowance mailed May 14, 2012.

U.S. Appl. No. 12/082,320, Office Action mailed Apr. 13, 2011.

U.S. Appl. No. 12/082,320, Office Action mailed Nov. 9, 2011.

U.S. Appl. No. 12/082,320, Office Action mailed Mar. 28, 2012.

U.S. Appl. No. 10/061,127, Officse Action mailed Jun. 23, 2004.

U.S. Appl. No. 10/061,127, Notice of Allowance mailed Jan. 5, 2005.

U.S. Appl. No. 10/724,558, Notice of Allowance mailed Sep. 9, 2004.

U.S. Appl. No. 11/042,788, Office Action mailed Jan. 16, 2007.

U.S. Appl. No. 11/042,788, Office Action mailed Jan. 31, 2008.

U.S. Appl. No. 11/042,788, Office Action mailed Sep. 3, 2008.

U.S. Appl. No. 11/042,788, Office Action mailed Oct. 30, 2008.

U.S. Appl. No. 11,042,788, Notice of Allowance mailed Mar. 9, 2009.

U.S. Appl. No. 09/626,629, Office Action mailed May 9, 2002.

U.S. Appl. No. 09/626,629, Notice of Allowance mailed Aug. 13, 2002.

U.S. Appl. No. 10/273,812, Office Action mailed Nov. 30, 2004.

U.S. Appl. No. 10/273,812, Office Action mailed Mar. 21, 2005.

U.S. Appl. No. 10/273,812, Notice of Allownce mailed Aug. 3, 2005.

U.S. Appl. No. 11/260,009, Office Action mailed Feb. 17, 2006.

U.S. Appl. No. 11/260,009, Notice of Allowance mailed Apr. 28, 2006.

U.S. Appl. No. 11/471,774, Notice of Allowance mailed Oct. 30, 2007.

U.S. Appl. No. 12/027,183, "Structures and fabrication techniques for solid state electrochemical devices," Visco et al., filed Feb. 6, 2008.

EP1228546, "Structures and fabrication techniques for solid state electrochemical devices," Visco et al., Aug. 7, 2002, abstract.

Seabaugh et al., "Low-cost fabrication processes for solid oxide fuel cells," NexTech exhibited at the Fuel Cells 2000 Conference in Protland, Oct. 30, 2000-Nov. 2, 2000, NexTech Materials, Ltd.

Fujii et al., "Manufacturing and characterization of metallic system support tube for solid oxide fuel cells," Bulletin of the Electrotechnical Laboratory, vol. 62, No. 1-2, 1998, p. 1319.

Momma et al., "High potential performance of tubular type SOFC using metallic system components," Electrotechnical Laboratory, Electrochemical Proceedings vol. 97-40, Jun. 1997, pp. 310-321.

Okuo et al., "Development of metallic substrate tubular SOFC," Electrotechnical Laboratory, Oct. 1994, pp. 908-919.

Okua et al., "Improvement in power stability and durability demonstration on new tubular type SOFC using metallic system component," vol. 60, No. 5, 1996, pp. 1-9.

Schiller et al., "Development of metallic substrate supported thin-film SOFC by applying plasma spray techniques," Electrochemical Society Proceedings, vol. 99-19, Oct. 1999, pp. 892-903.

Schiller et al., "Development of plasma sprayed components for a new SOFC Designs," Electrochemical Proceedings, vol. 97-40, Oct. 1999, pp. 634-645.

Schiller et al., "Development of SOFC components by vacuum plasma spraying," 1998, pp. 515-518.

Takenoiri et al., "Development of metallic substrate supported planar SOFC at Fuji Electric," Fuel Cell Seminar Abstracts, Nov. 1998, pp. 84-87.

Unal, et al., "Microstructures of $Y_2O_3$-Stabilized $ZrO_2$ Electron Beam—Physical Vapor Deposition Coatings on Ni-Base Superalloys", Department of Materials Science and Engineering, vol. 984-92, 1994, pp. 984-992.

Wallin, et al., "Cofired Solid Oxide Fuel Cells for Operation at 800° C", 1997, Abstract.

Yao, et al, "Improved preparation procedure and properties for a multiplayer piezoelectric thick-film actuator", Sensors and Actuators A 71, pp. 139-143.

"Mfg. Oxygen Sensor—Involves Applying Catalyst Metal Salt Soln. To Sintered Electrolyte, Reducing, Firing, Again Applying Metal Salt Soln. And Firing", Matsushita Elec Ind Co Ltd [MATU], 1979JP-0078760 (Jun. 21, 1979), (abstract), pp. 1-2.
CN patent application No. 200880128414.5, First Office Action issued Mar. 20, 2012.
PH patent application No. 12008502790, Office Action mailed Apr. 27, 2012.
RU patent application No. 2010105992/07, Office Action mailed Apr. 4, 2012.
PH patent application No. 12010500175, Office Action mailed May 23, 2012.
CN patent application No. 200680055443.4, Third Office Action mailed Apr. 16, 2012.
U.S. Appl. No. 11/791,258, Office Action mailed Jun. 7, 2012.
Ishihara et al., "Electrophoretic deposition of Y2O3-stabilized ZrO2 on the porous La0.8Sr02MnO3 cathode substrate for SOFC," Proceedings of the 4th International Symposium on Solid Oxide Fuel Cells, Electrochemical Society, 1995.
U.S. Appl. No. 11/791,258, Notice of Allowance mailed Jul. 25, 2012.
U.S. Appl. No. 13/599,362, "Structure and fabrication techniques for solid state electrochemical devices," Visco et al., filed Aug. 30, 2012.
U.S. Appl. No. 12/027,183, Notice of Allowance mailed Jul. 18, 2012.
CN patent application No. 200880108590.2, Office Action mailed Jun. 1, 2012.
PH patent application No. 12008502790, Office Action mailed Jul. 4, 2012.
U.S. Appl. No. 12/664,646, Office Action mailed Sep. 13, 2012.
U.S. Appl. No. 11/791,270, Office Action mailed Nov. 9, 2012.
U.S. Application No. 13/599,362, Office Action mailed Nov. 6, 2012.
U.S. Appl. No. 13/637,642, "Method of making electrochemical device with porous metal layer," Tucker et al., filed Sep. 26, 2012.
ID patent application No. W00201003079, Notification of Result of Substantive Examination Step I mailed Jun. 1, 2012.
ID patent application No. W00201003962, Notification of Result of Substantive Examination Step I mailed Jun. 18, 2012.
EP patent application No. 08826523.6, Examination Report mailed Oct. 23, 2012.
U.S. Appl. No. 12/304,191, Notice of Allowance mailed Nov. 15, 2012.
RU patent application No. 2010147046/07, Office Action mailed Oct. 19, 2012.
RU patent application No. 2010105992/07, Resolution on granting patent for invention mailed Sep. 6, 2012.
U.S. Appl. No. 12/988,297, Office Action mailed Jan. 2, 2013.
MY patent application No. PI2010000360, Substantive Examination mailed Dec. 31, 2012.
CN patent application No. 200680055443.4, Fourth Office Action mailed Nov. 21, 2012.
EP patent application No. 08 768 912.1, Communication under Rule 71(3) EPC, Intent to Grant, mailed Jul. 14, 2011.

* cited by examiner

A. Metal joint housing
B. Braze
C. Braze cap
D. Insulating member

▪▪▪▪▪▪▪▪▪ Rough (optionally) or porous surface

*FIG. 4*

SEALED JOINT STRUCTURE FOR ELECTROCHEMICAL DEVICE

CROSS-REFERENCE TO RELATED APPLICATIONS

This application claims priority to U.S. Provisional Patent Application No. 60/632,015 filed Nov. 30, 2004, entitled SEALED JOINT STRUCTURE FOR ELECTROCHEMICAL DEVICE.

STATEMENT OF GOVERNMENT SUPPORT

This invention was made with government support under Contract DE-AC02-05CH11231 awarded by the United States Department of Energy to The Regents of the University of California for the management and operation of the Lawrence Berkeley National Laboratory. The government has certain rights in this invention.

FIELD OF THE INVENTION

The present invention relates to a sealed joint for high-temperature electrochemical devices, such as solid oxide fuel cells, in particular, modular, parallel electrochemical cell-in-series stacks. The joint provides sealing, structural integrity, and electrical connection and insulation.

BACKGROUND

Solid-state electrochemical devices are normally cells that include two porous electrodes, the anode and the cathode, and a dense solid electrolyte membrane disposed between the electrodes. In the case of a typical solid oxide fuel cell, the anode is exposed to fuel and the cathode is exposed to an oxidant in separate closed systems to avoid any mixing of the fuel and oxidants due to the exothermic reactions that can take place with hydrogen fuel.

The electrolyte membrane is normally composed of a ceramic oxygen ion conductor in solid oxide fuel cell applications. In other implementations, such as gas separation devices, the solid membrane may be composed of a mixed ionic electronic conducting material ("MIEC"). The porous anode may be a layer of a ceramic, a metal or a ceramic-metal composite ("cermet") that is in contact with the electrolyte membrane on the fuel side of the cell. The porous cathode is typically a layer of a mixed ionically and electronically-conductive (MIEC) metal oxide or a mixture of an electronically conductive metal oxide (or MIEC metal oxide) and an ionically conductive metal oxide.

Solid oxide fuel cells normally operate at temperatures between about 900° C. and about 1000° C. to maximize the ionic conductivity of the electrolyte membrane. At appropriate temperatures, the oxygen ions easily migrate through the crystal lattice of the electrolyte.

Since each fuel cell generates a relatively small voltage, several fuel cells may be associated to increase the capacity of the system. Such arrays or stacks generally have a tubular or planar design. Planar designs typically have a planar anode-electrolyte-cathode deposited on a conductive interconnect and stacked in series. However, planar designs are generally recognized as having significant safety and reliability concerns due to the complexity of sealing of the units and manifolding a planar stack. Tubular designs utilizing long porous support tubes with electrodes and electrolyte layers disposed on the support tube reduce the number of seals that are required in the system. Fuel or oxidants are directed through the channels in the tube or around the exterior of the tube.

The utility of high-temperature (e.g., greater than 800° C., for example between about 900 and 1000° C.) electrochemical devices is limited by the quality and robustness of the seals that join multiple cells together or individual cells to cell housings or manifolds. Seals generally need to provide one or more of the following functions: separation of oxidant/fuel/process gases from each other and containment of the gases within the device, bonding between the sealed surfaces, and electrical connection or insulation. Of course, the seal material must not be a source of contamination for the other materials in the system. It is difficult for a single material to perform all of these functions at elevated temperature in oxidizing, reducing, or corrosive environments.

Many types of seal materials have been considered for use in high-temperature electrochemical devices, including ceramic adhesives, glass, brazes, and mica compressive seals. Each of these materials has limitations that prevent it from fulfilling all of the necessary requirements. Ceramic adhesives tend to be porous, preventing gas sealing. Glasses provide a good initial seal, but have a short lifetime due to thermal stress-induced cracking and chemical reaction with the joined surfaces. Brazes are expensive and conductive. Mica compressive seals often have a high leak rate and short lifetime due to cracking.

Thus, an improved sealed joint for electrochemical devices is needed.

SUMMARY OF THE INVENTION

The present invention utilizes a combination of materials in a compact structure to provide all the necessary functions of a joint for high-temperature electrochemical devices. A way of making the joint is also provided. The joint provides sealing, structural integrity, and electrical connection and insulation.

In one aspect, the joint includes: sections that bond the joining members to each other; one or more seal sections that provide gas-tightness; and, sections providing electrical connection and/or electrical insulation between the various joining members. Each of the sections may further be treated or covered to increase their operational lifetime. The joint is strong, gas-tight, and provides electrical management over a wide range of temperatures. The joint is appropriate for use in high-temperature electrochemical devices, such as solid oxide fuel cells.

An important feature of the invention lies in the partial or complete separation of the various joint functions so that materials and methods appropriate to each function can be combined to produce a joint that fulfills all the functional requirements, while containing all the functional materials in a compact volume. Traditionally, the various functions of the described joint require physical separation of the functional entities. The compact joint described here is expected to be inexpensive and easy to manufacture and to provide for a compact multi-cell structure.

Figure 2:
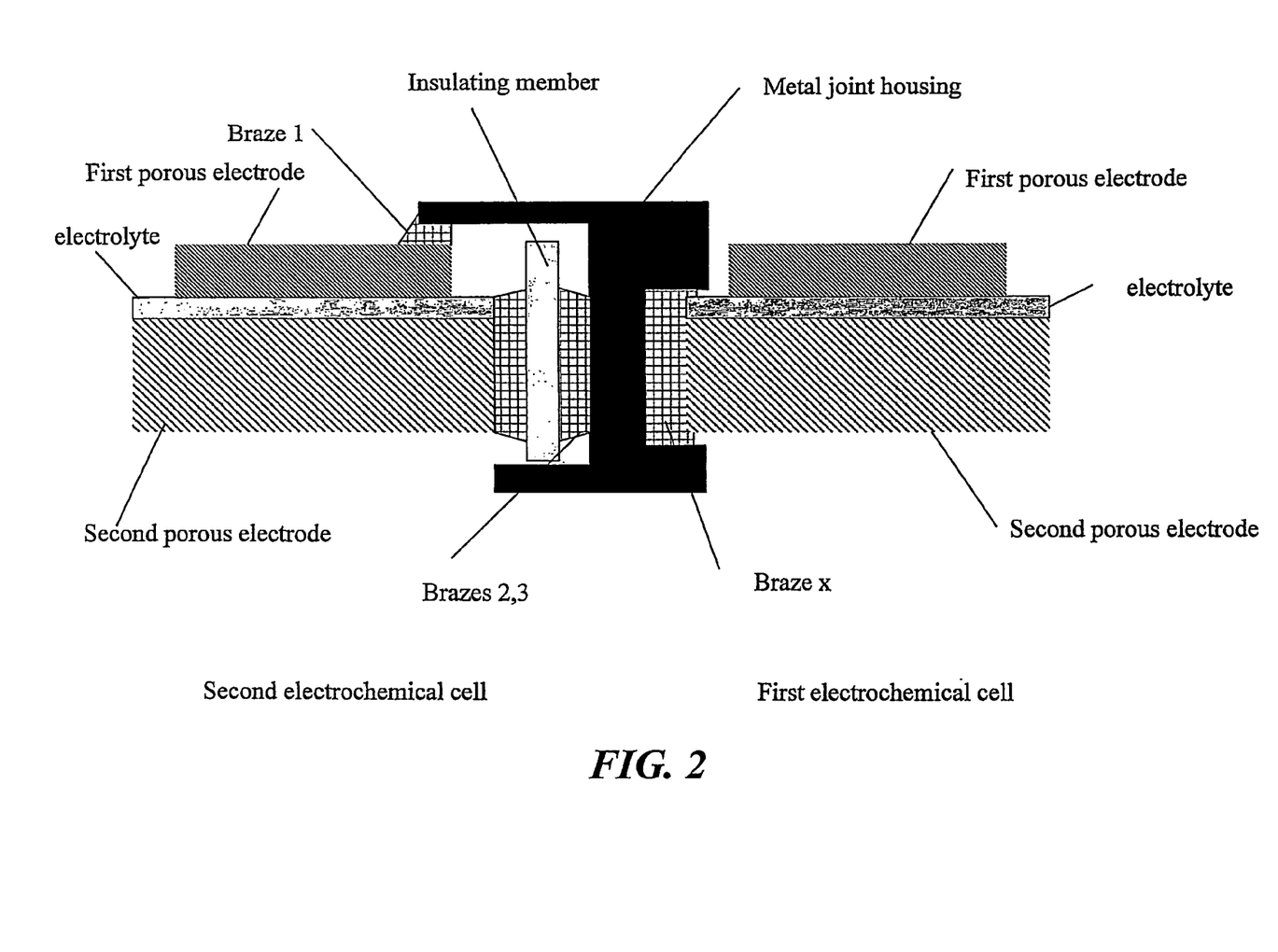
FIGS. 2 and 3 are cross-sectional of alternative specific embodiments of sealed joints in accordance with the present invention as used in a solid oxide fuel cell stack.

Some particularly advantageous features and techniques of specific embodiments of the invention, described further below, include the selection of the thickness of the braze and insulating material such that the combined CTE of the composite insulating member (comprising braze and insulation material as depicted in FIG. 2) is similar to that of the cell components. Also, roughening the surface of the joint metal housing that contacts the joint insulating member (D) can improve the joint strength. And in some cases it may be beneficial to replace the braze in the joint structure with a metal/metal sinter bond.

A suitable joint configuration for an electrochemical device has a metal joint housing, a first porous electrode, a second porous electrode, separated from the first porous electrode by a solid electrolyte, and an insulating member disposed between the metal joint housing and the electrolyte and second electrode. One or more brazes structurally and electrically connects the first electrode to the metal joint housing and forms a gas tight seal between the first electrode and the second electrode.

DESCRIPTION OF THE INVENTION

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope of the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The invention includes several members making up a joint, wherein the various members perform different functions. The joint is useful for joining multiple cells (generally tubular modules) of an electrochemical device to produce a multi-cell segment-in-series stack, for instance. The joint will be described in the context of this embodiment, however, this is intended to be illustrative, and does not limit the scope of applicability of the invention.

A suitable joint configuration for an electrochemical device in accordance with the present invention has a metal joint housing, a first porous electrode, a second porous electrode, separated from the first porous electrode by a solid electrolyte, and an insulating member disposed between the metal joint housing and the electrolyte and second electrode. One or more brazes structurally and electrically connects the first electrode to the metal joint housing and forms a gas tight seal between the first electrode and the second electrode.

Figure 1:
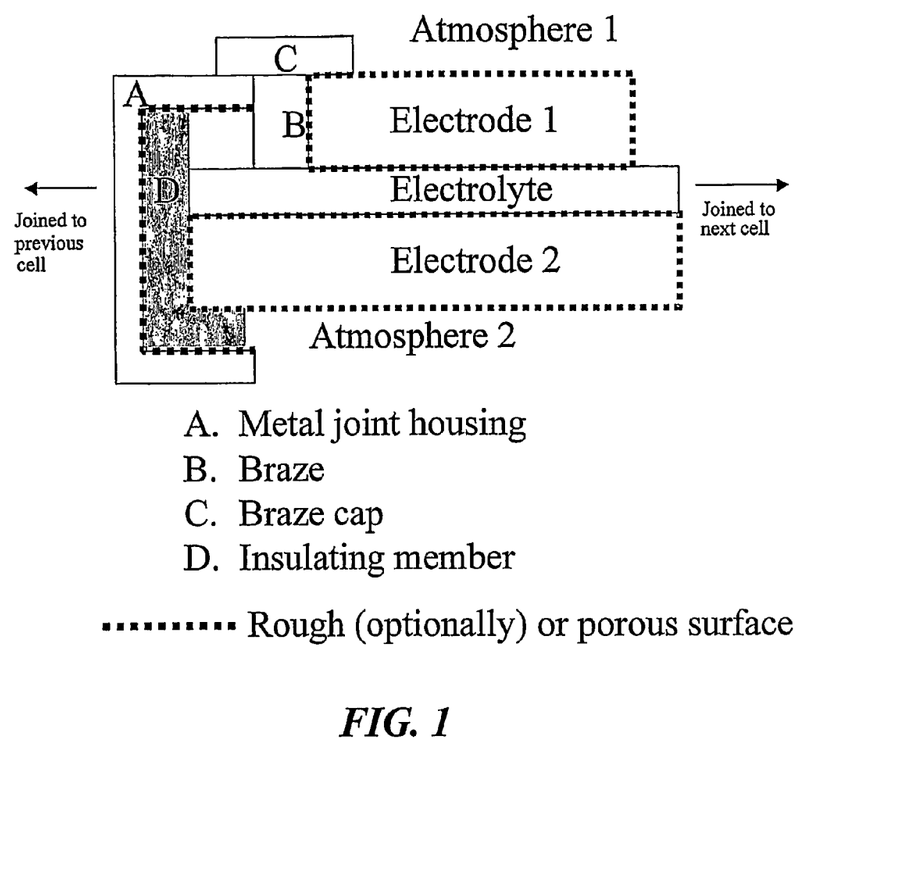
FIG. 1 illustrates general features of a sealed joint in accordance with the present invention as used in a solid oxide fuel cell stack.
Figure 3:
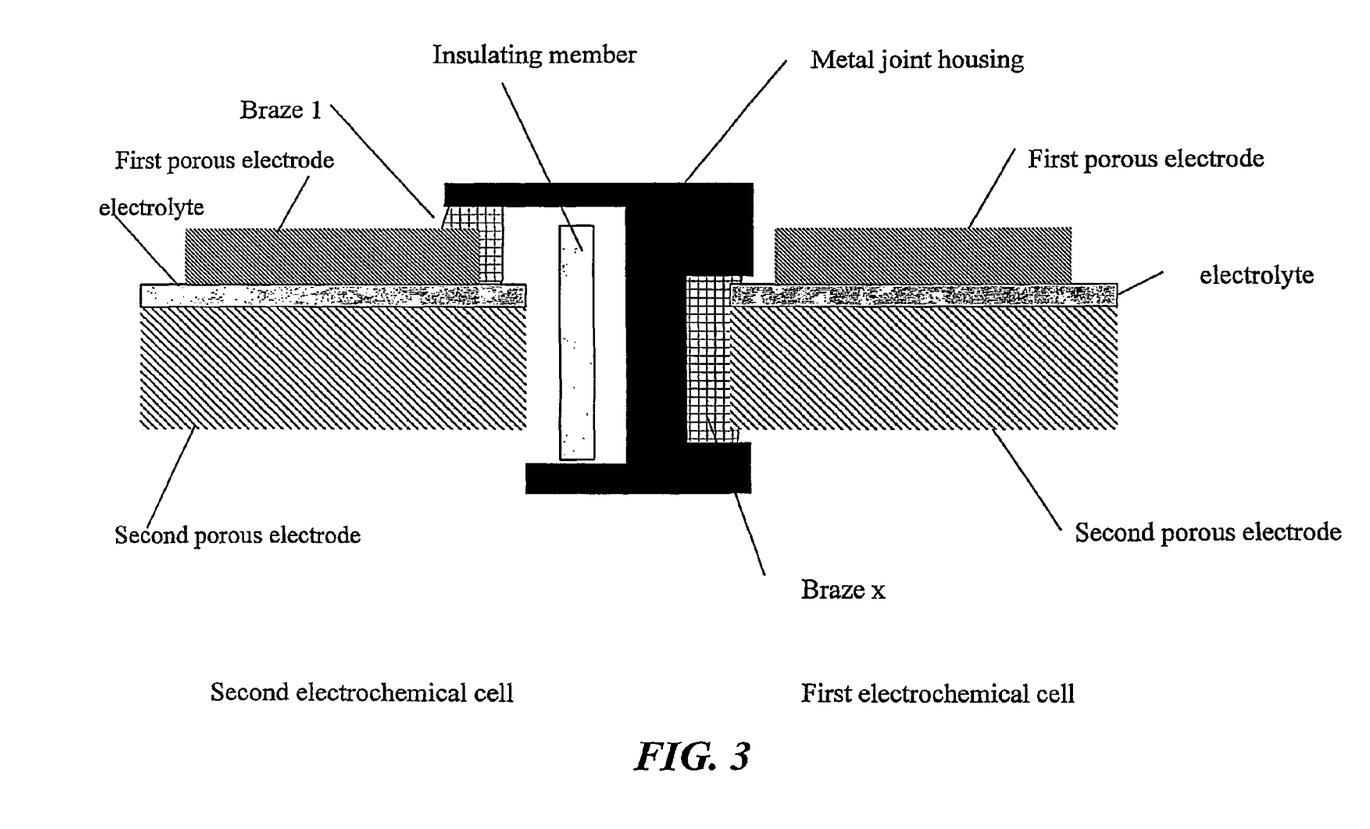
Figure 4:
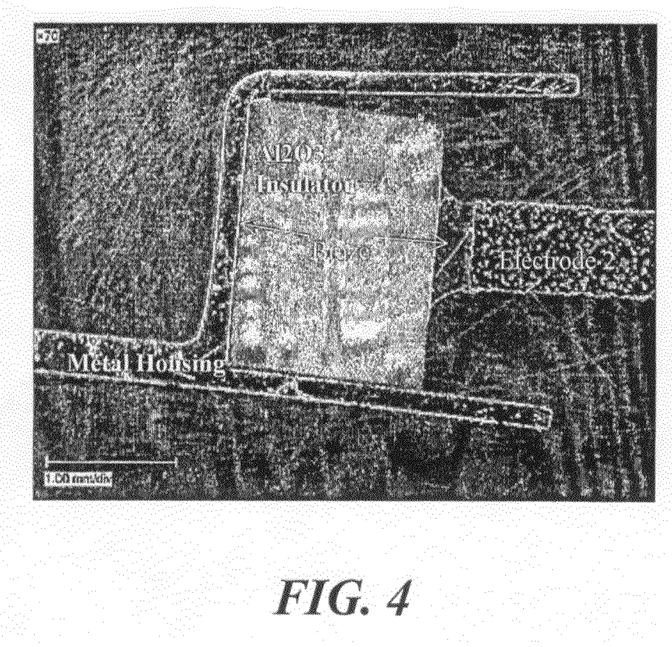
FIG. 4 is an optical microscopic image of a cross section of dense insulator brazed in place in accordance with one aspect of the present invention.

FIG. 1 illustrates the several general features of a joint in accordance with the present invention. The functions of the joint include providing mechanical joining of neighboring cells, sealing of the cells such that Atmosphere 1 and Atmosphere 2 do not mix, electrical connection between neighboring cells, and electrical insulation of the electrodes of the same cell from each other. One preferred geometry for the joint is indicated in FIG. 1, however, other geometries fulfilling the same functions are within the scope of the invention. FIGS. 2, 3 and 4 provide additional illustrating of particular aspects of joints in accordance with the present invention. The functions and features of the various joint members are summarized below.

Electrochemical cells generally comprise an ion-conducting electrolyte sandwiched between a porous anode and cathode in fuel cell applications. Although a fuel cell is used as an example of an electrochemical cell for purposes of illustration, it will be understood that the electrochemical cell may be an oxygen generator, syn-gas generator or hydrogen gas separator and similar devices.

Electrochemical cells can be either anode supported, cathode supported or electrolyte supported. Electrode supported electrochemical cells can have electrode supports that are a ceramic, a ceramic metal composite (cermet) or an metal alloy. In one embodiment, the cells are manufactured as bi-layers such as Ni-YSZ/YSZ or LSM/YSZ and the counter electrode is applied after the high temperature sintering of the bi-layer. In another embodiment, all three layers are applied and sintered in one high temperature step. For example, LSM/YSZ/LSM or LSM/YSZ/Ni-YSZ tri-layers can be sintered in one step.

Additionally, it will be understood that the electrode supported structures can also be multi-layered or graded structures composed of different materials and/or microstructures and not simply a homogeneous electrode. For example, a cathode supported design could consist of an extruded or injected molded porous LSM support to which is applied a layer of porous LSM+YSZ and onto this is applied the YSZ electrolyte film and the counter electrode. Alternatively a porous catalytic layer, such as Ni-YSZ, can be positioned between a porous alloy layer, such as a ferritic steel, and the electrolyte layer, such as YSZ.

The preferred height of an electrochemical cell is determined by the conductivity of the electrode layers. For ceramic supported structures the electrochemical cell is preferably between approximately 1 cm to approximately 5 cm in height. For metal supported electrochemical cell structures the cells are preferably between approximately 2 cm and approximately 10 cm in height.

The cathode electrode is preferably a cylindrical or rectangular tube ranging in thickness from approximately 100 µm to approximately 3000 µm in cathode supported embodiments. However, cathode layers ranging in thickness of between approximately 150 µm to approximately 2000 µm are especially preferred. In anode supported electrochemical cells, the cathode is preferably applied as a thin film to one surface of the electrolyte and bonded to provide a cathode electrode ranging in thickness of between approximately 50 µm to approximately 1500 µm. It will be understood that the selected thickness of the electrode tubes and electrolyte can vary depending on the thermal expansion, electronic conductivity and ionic conductivity characteristics of the electrode and electrolyte materials.

Suitable cathode electrode materials in accordance with the present invention include cermets, ceramics and metals. For example, suitable ceramic components include: $La_{1-x}Sr_xMn_yO_{3-\delta}$ ($1 \geq X \geq 0.05$) ($0.95 \leq y \leq 1.15$) ("LSM") ($\delta$ is defined as that value signifying a small deviation from perfect stoichiometry), $La_{1-x}Sr_xCoO_{3-\delta}$ ($1 \geq X \geq 0.10$) ("LSC"), $La_{1-x}Sr_xFe_yO_{3-\delta}$ ($1 \geq X \geq 0.05$) ($0.95 \leq y \leq 1.15$) ("LSF"), $SrCo_{1-x}Fe_xO_{3-\delta}$ ($0.30 \geq X \geq 0.20$), $La_{0.6}Sr_{0.4}CO_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15), $(Bi_2O_3)_{0.75}(Y_2O_3)_{0.25}$ and alumina.

Preferred LSM materials include $La_{0.8}Sr_{0.2}MnO_3$, $La_{0.65}Sr_{0.30}MnO_{3-\delta}$, and $La_{0.45}Sr_{0.55}MnO_{3-\delta}$. Suitable metal components, including for the cermets, are transition metals, Cr, Fe, Ag and/or alloys such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5Fe1Y and chrome-containing nickel-based alloys such as Ni20Cr and Inconel alloys including Inconel 600 (Ni 76%, Cr 15.5%, Fe 8%, Cu 0.2%, Si 0.2%, Mn 0.5%, and C 0.08%).

A very thin layer of electrolyte is preferably applied to the cathode tube. It has been shown that the operating temperature of an electrochemical cell can be reduced with the use of thin film ceramic electrolytes and electrodes because of the reduction of ohmic losses across ionic and ionic-electric conducting materials deposited as thin films. The bi-layer is then co-fired to yield a pinhole free, dense film of electrolyte that is well bonded to the porous structure of the electrode in one embodiment. The sintering behavior of both film and substrate materials should also be considered in the selection of electrolyte and electrode materials. For example, it may be necessary to fire the second electrode at a different temperature than used to give the electrolyte sufficient density to prevent gases from crossing the electrolyte layers or the temperature used to process the first electrode depending on the nature of the selected electrode material.

Several approaches to thin film fabrication are known in the art including physical vapor deposition techniques, tape calendaring, sol-gel deposition, sputtering, colloidal deposition, centrifugal casting, slip-casting, tape-casting, extrusion, screen printing, brushing, tape transfer, co-extrusion, electrophoretic deposition, dip coating, aerosol spray, vacuum infiltration, plasma deposition, electrochemical deposition, and many other methods know in the art. Dip coating, aerosol spray, and screen printing are preferred. Heating the layers to a sufficient temperature to ensure bonding of the porous support and densification of the electrolyte is typically required.

While there are many methods of creating thin films, it is preferred that the films be deposited using a colloidal deposition method. In this embodiment, the electrolyte material is generally prepared as a suspension of the powder material in a liquid media, such as water, isopropanol, and other suitable organic solvents. The suspension may be applied to a surface of an electrode layer by a variety of methods; for example, by aerosol spray, dip coating, electrophoretic deposition, vacuum infiltration, or tape casting. Typically, green films of the desired oxide are colloidally deposited onto green or partially fired substrates. In addition, the film should be well bonded to the surface of the substrate without excessive infiltration into the porosity of the electrode and there should be minimal polarization at the interface between the electrolyte and electrode.

The colloidal process is preferred because it is inexpensive and scaleable, and can produce devices with high performance at reduced temperatures. However, colloidal deposition of dense electrolyte layers on porous substrates requires that the materials be chemically compatible at the processing temperature and there must be an adequate thermal expansion match between the layers.

A pinhole and crack free dense layer of electrolyte 30 ranging from approximately 1 μm to approximately 50 μm in thickness on electrode substrates of high porosity and suitable microstructure to ensure low overpotential during device operation are generally preferred. For typical fuel cell applications, an electrolyte layer ranging from approximately 10 μm to approximately 30 μm in thickness is preferred.

The electrolyte material is preferably composed of a thin layer of a metal oxide (ceramic) powder, such as yttria stabilized zirconia (YSZ) (e.g., $(ZrO_2)_x(Y_2O_3)_y$ where $(0.88 \geqq X \geqq 0.97)$ and $(0.03 \leqq y \leqq 0.12)$. The preferred material is $(ZrO_2)_{0.92}(Y_2O_3)_{0.08}$ or $(ZrO_2)_{0.90}(Y_2O_3)_{0.10}$ that are available commercially. Other possible electrolyte materials include $(ZrO_2)_{0.9}(Sc_2O_3)_{0.1}$ scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$. Alternatively, the electrolyte material may be a mixed ionic electronic conductor, for example $SrCo_{1-x}Fe_xO_{3-\delta}$ $(0.30 \geqq X \geqq 0.20)$, $La_{0.6}Sr_{0.4}CO_{0.6}Fe_{0.4}O_{3-\delta}$, $Sm_{0.5}Sr_{0.5}CoO_3$ and $La_{1-x}Sr_xCoO_{3-\delta}$. Such structures may also find use in oxygen separation devices, for example.

The anode electrode on the cathode supported electrochemical cell is preferably a thin film ranging in thickness from approximately 50 μm to 500 μm. However, electrode layers ranging in thickness of between approximately 150 μm to approximately 300 μm are preferred. In anode supported electrochemical cells, an anode tube ranging in thickness from between approximately 250 μm to approximately 2500 μm is preferred.

Electrode and electrolyte materials are preferably matched and the thickness of the applied materials may be selected based on the thermal expansion, electronic conductivity and ionic conductivity characteristics of the electrode and electrolyte materials as well as the interconnect materials. In addition, the thickness of the film of electrolyte may depend the ability of the electrolyte material to be gas impermeable and maintain its mechanical integrity e.g., resist cracking when exposed to a range of operating and rest temperatures.

The metal joint housing can be made of inexpensive ferritic steel materials which have a thermal expansion which match the typical electrode and electrolyte materials. Metals used for the metal joint housing include but are not limited to: Ni, Cu, alloys containing Ni, Ni based superalloys, alloys containing Cu, alloys containing Fe, stainless steel, Fe based alloys containing Cr, Fe—Cr alloys containing a reactive element such as Y or La, austenitic steels such as AISI 304 or 316, ferritic steels such as AISI 430 or 446, Al containing alloys, Fe—Cr alloys containing Al and a reactive element such as Y, Fe—Cr alloys containing 0.1 to 3.0 wt % Mn, Fe—Cr alloys containing 12-30 wt % Cr, Fe—Cr alloys containing 16-26 wt % Cr, Fe based alloys containing 18 to 22 wt % Cr with 0.5 to 2.0 wt % Mn and 0.1 to 1.0 wt % Y. Surface modification of part or all of the metal by sol-gel deposition, vapor deposition, plasma spray, plating, or any other means know in the art is also suitable.

As depicted in FIG. 1, a single cell comprises Electrode 1, Electrode 2, and the Electrolyte. Electrodes 1 and 2 must be electrically insulated from one another. Electrode 1 is electrically connected to Electrode 2 of the previous cell; Electrode 2 is electrically connected to Electrode 1 of the next cell. The joint depicted in FIG. 1 also includes the following features:

Metal joint housing: provides structural support for the joint, as well as electrical connection between adjoining cells as described above. Roughening the surface of the metal housing that contacts the Insulating Member (D) can improve the joint strength in certain embodiments (e.g., where the insulator is an adhesive). The surface need not be rough for a brazed-in-place insulator.

A. Roughening can be accomplished by various methods, including sand blasting, chemical etching, sintering on metal powder, or knurling.

B. Braze: provides bonding and electrical connection between Electrode 1 and the Metal housing (A), and sealing such that Atmosphere 1 (at Electrode 1) and Atmosphere 2 (at Electrode 2) do not mix. Brazes based on Ag, Au, Cu, or Ni alloys, or brazing alloys mixed with ceramics such as alumina, silica, or titania, or, more preferably a particulate or fibrous braze filler having a coefficient of thermal expansion of no more than 6 ppm/K (e.g., aluminum/magnesium titanate or zirconium tungstanate) are preferred. Brazes can be applied as preforms such as wire or foil, or pastes or paints. Pastes or paints are typically applied by syringe, spray, brush, roller, injection, or screen printing.

C. Braze cap: reduces exposure of the Braze (B) to Atmosphere 1. This is especially important if Atmosphere 1 is oxidizing or corrosive. The braze cap can be made of ceramic adhesive, glass sealant, etc. In the case that Braze (B) is stable in Atmosphere 1, the Braze cap is not necessary.

D. Insulating member: prevents electrical short-circuit by providing insulation between Electrode 2 and Metal joint housing (A). In the case that the Insulating member is nonporous, it aids in preventing Atmosphere 1 and Atmosphere 2 from mixing. In the case that the Insulating member bonds to the Metal joint housing (A) and Electrode 2 and/or Electrolyte, it aids in mechanical joining of the cell to the Metal joint housing (A). Various materials can be used as the Insulating member, including: ceramic- or glass-based adhesive, a dense or porous ceramic member that can be fitted or brazed in place, or a glass member.

The Metal joint housing of one cell can be joined to the previous cell, i.e. by brazing, to create multiple cells in series (segment-in-series design). As shown in FIG. 1, in the case of a porous insulating member, the Braze (B) is solely responsible for gas sealing. In the case of a dense insulating member, the insulator itself can aid in gas sealing. For instance, a glass insulator (e.g., $SiO_2$— or $Al_2O_3/SiO_2$-based glasses) can be adhered to the cell and Metal joint housing (A), or a ceramic insulator (e.g., $Al_2O_3$) can be brazed to the Metal joint housing and cell, as shown in FIGS. 2 and 4.

In this embodiment, the electrolyte comes in contact with the Braze. This can be a source of weakness, as thermal expansion mismatch between the braze and electrolyte can cause the electrolyte to crack, allowing Atmospheres 1 and 2 to mix. It is possible to modify the electrolyte layer composition to strengthen it or replace it entirely with a stronger material in the vicinity of the joint. For instance, in the case of yttria-stabilized zirconia (YSZ) electrolyte, some $Al_2O_3$ can be mixed with the electrolyte during the cell formation process. This reduces the conductivity of the electrolyte somewhat, but can substantially increase its resistance to cracking. Alternatively, the composition of the electrolyte can vary from YSZ-rich in the interior of the cell to $Al_2O_3$-rich in the vicinity of the braze.

The components of the cell and the metal joint housing (A) are chosen such that they have similar coefficients of thermal expansion (CTE). This reduces thermal stress in the device, especially during temperature excursions such as start-up or shut-down. For instance, in a SOFC all of the components are matched to the CTE of the electrolyte (i.e., 10.5 ppm/K for YSZ). Many appropriate insulating materials, such as $Al_2O_3$, have a CTE lower than that of YSZ, whereas most braze materials have a higher CTE. Therefore it is preferable to choose the thickness of the braze and insulating material such that the combined CTE of the composite insulating member (comprising braze and insulation material as depicted in FIGS. 2 and 4) is similar to that of the cell components. For example, a 0.5 mm alumina insulating member can be brazed with 0.2 mm of braze material.

In the case that the insulating member comprises an adhesive, it is preferred that the surfaces joined by the adhesive are roughened, porous, oxidized, or coated with a primer layer to improve bonding. The effect of surface treatment on the shear strength of a lap joint made by joining 430 stainless steel strips using a phosphate-based adhesive binder filled with insulating particles has been examined. The results are tabulated below. Clearly, all of the surface treatments improved the shear strength. The surface of a porous metal supported electrode (e.g., Electrode 2) is naturally similar to a sintered surface. Therefore, bonding of an insulating adhesive to Electrode 2 is expected to be strong. Improvement in the joint strength for the geometry shown in FIG. 1 is expected for treatment of the metal joint housing. Appropriate treatments also include but are not limited to: chemical etching or oxidizing, sanding, sandblasting, scribing or knurling, etc.

| Adhesive Filler | Surface Treatment on Steel Strip | Shear Strength (kPa) |
| --- | --- | --- |
| Al2O3 | none | 1700 |
| Al2O3 | roughened by sandblasting | 3000 |
| ZrO2 | none | 1400 |
| ZrO2 | FeCr particles sintered on to create porous surface | 2900 |
| ZrO2 | Silver-filled adhesive primer layer | 4300 |
| MgO/Al2O3 | none | 1000 |
| MgO/Al2O3 | oxidized 1 h 900 C. in air | 1700 |

FIGS. 2 and 3 provide alternate illustrations of embodiments of the present invention described generally with reference to FIG. 1 and include many of its general aspects described above. In FIG. 2, the first electrode (of the second electrochemical cell) is structurally and electrically connected to the metal joint housing by braze 1 and the gas tight seal between electrodes 1 and 2 is provided by a pair of brazes (brazes 2 and 3) on either side of the insulting member.

In FIG. 3, the first electrode is again structurally and electrically connected to the metal joint housing by braze 1. However, in this embodiment, the braze is extended to make contact with the electrolyte and so also provides the gas tight seal between electrodes 1 and 2, regardless of whether brazes 2 and 3 on either side of the insulting member are present. In the absence of the brazes sealing the insulating member to the electrolyte and metal housing, the insulating member can float and CTE mismatch issues between the insulating member and the electrolyte are avoided.

A metal-supported SOFC including a joint in accordance with the present invention may be assembled as follows:

Cell Assembly
1. Assemble Electrode 2 green (unsintered) body
   form metal support
   apply porous YSZ interlayer
2. Spray Electrolyte green body onto electrode 2
3. Co-sinter Electrode 2 and electrolyte in reducing atmosphere 1100-1400° C. (1300° C. typical)
4. Apply Electrode 1 green body to Electrolyte
   apply porous YSZ interlayer
   apply current collector (decorated metal)
5. Sinter complete cell structure in reducing atmosphere 1100-1400° C. (1300° C. typical)

Cell structure is complete (catalysts to be infiltrated later). Further detail relating to cell assembly as described herein may be found in commonly-assigned U.S. Pat. No. 6,605,316, incorporated herein by reference in its entirety and for all purposes.

Note: Step 3 is optional (i.e., all 5 layers can be co-sintered in one step). Step 3 allows inspection/quality control of the electrolyte layer before covering it with Electrode 1.

Joint Assembly

6. Join Metal Housing A to Cell using insulating member D
    place member
    if member D is an adhesive: cure (in air, various curing protocols in the range 20-350° C.)
    if member D is a dense spacer brazed in place: curing step is unnecessary, and joining occurs later during braze step 8
7. Place braze alloy paste/powder/preform
Step 7 can also be performed during assembly in step 6
8. Braze in typically inert/reducing, possibly oxidizing atmosphere at 5-150° C. above the braze melting point (i.e. 800-1100° C. for silver-based brazes)
9. Apply cap (optional, depending on nature of braze material, as noted above)

The braze may be replaced with a metal/metal sinter bond to connect electrode 2 to the metal joint housing (A) in next cell of a segment in series structure; Electrode 2 can be bonded to insulating member (D) in the same cell using a decoration and sinter technique, such as described in co-pending International Patent Application No. PCT/US2005/043109, filed Nov. 29, 2005, entitled JOINING OF DISSIMILAR MATERIALS, claiming priority from U.S. provisional patent application No. 60/632,030, filed Nov. 30, 2004, entitled JOINING OF DISSIMILAR MATERIALS, the disclosures of which are incorporated herein by reference. Steps 7, 8 are replaced with another sintering step like Step 5. It is possible to incorporate this during the Cell Assembly steps.

The order of the required steps is optional, and will be adjusted for the particular materials set.

Catalyst Preparation

Catalysts may be infiltrated or incorporated in Cell Assembly. The following description provides information regarding the preparation of catalysts in accordance with a specific embodiment: The catalysts (Cathode/Electrode 1 in particular) cannot generally handle the harsh conditions required for brazing or metal/metal sintering, so they are added after those steps are complete.

10. Infiltrate catalyst precursor material into porous YSZ and support/current collector
11. Form catalyst (typically at 600-800° C. in air)
    catalyst formation can be a separate step, or can occur during the first operation of the cell Further detail relating to catalyst preparation as described herein may be found in commonly-assigned U.S. Pat. No. 6,682,842, incorporated herein by reference in its entirety and for all purposes.

The joint of the present invention may, without limitation, find use as follows:

1. sealing/joining electrochemical devices;
2. sealing/joining electronic devices; and,
3. sealing/joining fluid transport devices (e.g., heat exchangers, gas separators, water desalinization devices and gas manifolds).

CONCLUSION

Thus, the invention encompasses a combination of materials in a compact structure to provide all the necessary functions of a joint for high-temperature electrochemical devices.

A way of making the joint is also provided. The joint provides sealing, structural integrity, and electrical connection and insulation.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All referenced documents cited herein are incorporated by reference for all purposes.

What is claimed:

1. A joint for a segment-in-series electrochemical device, comprising:
   a metal joint housing;
   a first electrochemical cell, comprising,
      a first porous electrode,
      a second porous electrode, separated from the first porous electrode by a solid electrolyte, and
      an insulating member disposed between the metal joint housing and the electrolyte and second electrode, and
      one or more brazes structurally and electrically connecting the first electrode to the metal joint housing and forming a gas tight seal between the first electrode and the second electrode;
   wherein the metal joint housing is disposed adjacent to ends of the first and second porous electrodes and the solid electrolyte of the first electrochemical cell such that it is configured for segment-in-series connection to an adjacent electrochemical cell such that ends of first and second porous electrodes and a solid electrolyte of the adjacent electrochemical cell are also adjacent the metal joint housing such that the cells are joined end-to-end.

2. The joint of claim 1, wherein the structural and electrical connection between the first electrode and the metal joint housing and the gas tight seal between the first electrode and the second electrode are both provided by a single braze connecting the first electrode, metal joint housing and electrolyte.

3. The joint of claim 1, wherein the insulating member is dense.

4. The joint of claim 3, wherein the structural and electrical connection between the first electrode and the metal joint housing is provided by a first braze, and the gas tight seal between the first electrode and the second electrode is provided by a second braze connecting the insulating member to the electrolyte and a third braze connecting the insulating member to the joint metal housing.

5. The joint of claim 4, wherein the second braze also connects the second electrode.

6. The joint of claim 5, wherein the first electrode comprises a metal.

7. The joint of claim 6, wherein the second electrode comprises a metal.

8. The joint of either of claim 7, wherein the metal of the second electrode comprises a stainless steel or Ag current collector.

9. The joint of claim 8, wherein the current collector is stainless steel.

10. The joint of claim 1, wherein the insulating member comprises a material selected from the group consisting of a dense ceramic, a porous ceramic, a ceramic-based adhesive, a glass-based adhesive or a glass member.

11. The joint of claim 1, wherein the joint joins the adjacent cells forming a multi-cell segment-in-series stack and the metal joint housing is also joined to the adjacent cell.

12. The joint of claim 1, wherein the one or more brazes are comprised of a material selected from the group consisting of Ag, Au, Cu, Ni alloys, and brazing alloys mixed with one or more ceramic fillers.

13. The joint of claim 12, wherein the one or more ceramic braze fillers have a coefficient of thermal expansion of no more than 6 ppm/K.

14. The joint of claim 13, wherein the filler is selected from the group consisting of aluminum/magnesium titanate, zirconium tungstanate or mixtures thereof.

15. The joint of claim 1, wherein the electrolyte composition is modified to strengthen it or is replaced entirely with a stronger material in the vicinity of the joint.

16. The joint of claim 15, wherein the electrolyte comprises yttria-stabilized zirconia (YSZ) modified with $Al_2O_3$.

17. The joint of claim 10, wherein the insulating member is an adhesive and the surface of the joint metal housing that contacts the insulating member is roughened.

18. The joint of claim 1, wherein the electrochemical device is a solid oxide fuel cell.

19. The joint of claim 1, wherein the electrochemical device has a tubular format.

20. A method of joining cells in a high-temperature electrochemical device, comprising:
providing
  a metal joint housing;
  a first electrochemical cell, comprising,
    a first porous electrode,
    a second porous electrode, separated from the first porous electrode by a solid electrolyte, and
    an insulating member disposed between the metal joint housing and the electrolyte and second electrode, and
  forming one or more brazes structurally and electrically connecting the first electrode to the metal joint housing and forming a gas tight seal between the first electrode and the second electrode;
wherein the metal joint housing is disposed adjacent to ends of the first and second porous electrodes and the solid electrolyte of the first electrochemical cell such that it is configured for segment-in-series connection to an adjacent electrochemical cell such that ends of first and second porous electrodes and a solid electrolyte of the adjacent electrochemical cell are also adjacent the metal joint housing such that the cells are joined end-to-end.

21. The method of claim 20, wherein the one or more brazes are formed in a single brazing operation.

* * * * *